Patented Oct. 31, 1950

2,527,807

UNITED STATES PATENT OFFICE 2,527,807

SUBSTITUTED 1,3,5 TRISILAPENTANES

John T. Goodwin, Jr., Midland, Mich., assignor to Dow Corning Corporation, Midland, Mich., a corporation of Michigan No Drawing. Application March 19, 1949, Serial No. 82,474

4 Claims. (Cl. 260—448.2)

The present invention relates to the production of new organosilicon compounds and to the fluids so produced.

The present organosilicon industry is based upon siloxanes which are materials in which the silicon atoms are linked through oxygen atoms. Another type of compound is one in which the silicon atoms are linked directly to each other. Still a third type is one in which the silicon atoms are linked by organic radicals. The literature presents very little information on this last type of compound.

One object of the present invention is to produce organosilicon compounds in which the silicon atoms are linked by methylene radicals. Still other objects and advantages of the present invention will be apparent from the following description.

In the present specification and claims R represents a hydrocarbon radical of the group consisting of alkyl radicals such as methyl to octadecyl and monocyclic aryl radicals such as phenyl, tolyl and xylyl and Y represents a substituent of the group consisting of alkoxyl and halogen preferably ethoxyl, chlorine and bromine.

In accordance with the present invention compounds of the type $Y_2RSiCH_2SiR_2CH_2SiRY_2$ are prepared by reacting a compound of the type $XCH_2SiRY_2$ and a compound of the type $R_2SiY_2$ by contacting the former with an alkali metal in the presence of the latter. By this method, tetrafunctional compounds are produced. In the formulae, X represents a halogen atom, preferably chlorine or bromine and R and Y have the above indicated meaning.

The production of the present compounds by this method is not in accord with expectation since a Wurtz reaction might be expected to occur between the halogen methyl radicals. Also in connection with halogen atoms on silicon it might be expected that a disilane type of linkage would result. However, it has been found that the two compounds interact preferentially under the defined conditions in a manner to give the alternating silicon carbon linkages.

The reactant of the type $XCH_2SiRY_2$ may be made in a variety of ways. Thus, in the case of chloromethylmethyldichlorosilane, this material may be produced by the direct chlorination of dimethyldichlorosilane as described in the literature. The equivalent ester may be produced by the substitution of alkoxy radicals for the chlorine atoms by reacting the above silane with the desired alcohol. Alternatively, these same materials may be produced by chlorinating methyltrichlorosilane, which product may then be reacted with a methyl Grignard reagent to give chloromethylmethyldichlorosilane. In case other hydrocarbon radicals than methyl radicals are desired, the latter of the above methods may be employed. That is, chloromethyltrichlorosilane may be reacted with Grignard reagents other than methyl Grignard, for example with an ethyl Grignard or a higher alkyl Grignard, such as octadecyl Grignard. Likewise, in this process, aryl groups can be substituted by the use of appropriate Grignards, such as phenyl Grignard.

The above preferred method of preparing the compounds hereof is conducted by contacting the alkali metal and a compound of the type $XCH_2SiRY_2$ in the presence of a compound of the type $R_2SiY_2$, the latter two compounds in liquid phase. Thus, it is possible to add the alkali metal in cut pieces or in a finely divided solid state to a mixture of the reactants at room temperature or at a somewhat elevated temperature. In this case the reaction proceeds relatively slowly unless the temperature is elevated to above the melting point of the alkali metal. The suspension is maintained at a temperature above the melting point of the alkali metal. The reactants of the type, $XCH_2SiRY_2$ and $R_2SiY_2$ may be mixed and then added to a suspension of the alkali metal, or the reactant of the type $R_2SiY_2$ may first be added to the alkali metal in suspension, and then the other reactant $XCH_2SiRY_2$ added.

The reactants may be interacted in stoichiometric amounts to produce compounds of the type $Y_2RSiCH_2SiR_2CH_2SiRY_2$. An excess of the compound $R_2SiY_2$ does not modify the course of the reaction and the excess may be later recovered from the product. In case of an excess of the other material, $XCH_2SiRY_2$, this excess results in the production of higher molecular weight products, which may be separated from the desired products.

*Example*

A mixture of 182.5 parts by weight of $ClCH_2CH_3Si(OC_2H_5)_2$ and 64.5 parts of $(CH_3)_2SiCl_2$ was added to 46 parts of molten sodium in 216.9 parts of toluene. The temperature was maintained at 110° C. The products were then cooled, filtered and the salt cake washed with toluene. Upon distillation, there was obtained 46 parts of a compound identified as $(C_2H_5O)_2CH_3SiCH_2Si(CH_3)_2CH_2SiCH_3(OC_2H_5)_2$ The compound was found to have a boiling point of 159° C. at 25 mm., a refractive index of 1.4282 at 25° C., a density of .9229 at 25° C., and a specific refraction of 0.2790. The corresponding chloride may be prepared by substituting chlorine for each of the four ethoxyl radicals by reacting the above tetraethoxy compound with acetyl chloride and removing the tetrachloro derivative from the product by distillation. The compound so prepared is $Cl_2CH_3SiCH_2Si(CH_3)_2CH_2SiCH_3Cl_2$ That which is claimed is:

1. The method which comprises reacting an alkali metal with a compound of the general formula $XCH_2SiRY_2$ and a compound of the general formula $R_2SiY_2$ in liquid phase by contacting the alkali metal with the latter in the presence of the former, in which each R represents a radical of the group consisting of alkyl and monocyclic aryl radicals, and Y represents a substituent of the group consisting of alkoxy radicals and halogen atoms, whereby a composition of the formula $Y_2RSiCH_2SiR_2CH_2SiRY_2$ is obtained.

2. The method in accordance with claim 1 in which each R represents methyl.

3. Compounds of the formula $Y_2RSiCH_2SiR_2CH_2SiRY_2$ in which each R represents a radical of the group consisting of alkyl and monocyclic aryl radicals and each Y represents a substituent of the group consisting of alkoxy radicals and halogen atoms.

4. Compounds of the formula $Y_2CH_3SiCH_2Si(CH_3)_2CH_2SiCH_3Y_2$ where Y is selected from the group consisting of alkoxy radicals and halogen atoms.

JOHN T. GOODWIN, Jr.

REFERENCES CITED

The following references are of record in the file of this patent:

Sommer, "Jour. Am. Chem. Soc.," vol. 69 (1947), page 980.

Goodwin, "Jour. Am. Chem. Soc.," vol. 69 (1947), page 2247.